(12) United States Patent
Moedinger et al.

(10) Patent No.: US 9,103,460 B2
(45) Date of Patent: Aug. 11, 2015

(54) CONTROL HEAD FOR A FLUID-ACTUATED VALVE

(75) Inventors: Uwe Moedinger, Wernau (DE); Mathias Schneider, Herrenberg (DE)

(73) Assignee: FESTO AG & CO. KG, Esslingen (DE)

( * ) Notice: Subject to any disclaimer, the term of this patent is extended or adjusted under 35 U.S.C. 154(b) by 154 days.

(21) Appl. No.: 13/883,908

(22) PCT Filed: Oct. 27, 2011

(86) PCT No.: PCT/EP2011/005420
§ 371 (c)(1),
(2), (4) Date: May 7, 2013

(87) PCT Pub. No.: WO2012/062417
PCT Pub. Date: May 18, 2012

(65) Prior Publication Data
US 2013/0233416 A1 Sep. 12, 2013

(30) Foreign Application Priority Data

Nov. 9, 2010 (DE) .......................... 10 2010 050 662

(51) Int. Cl.
| | |
|---|---|
| *F16K 37/00* | (2006.01) |
| *F16K 31/122* | (2006.01) |
| *F16K 27/04* | (2006.01) |
| *F15B 15/20* | (2006.01) |
| *F15B 15/28* | (2006.01) |
| *F16K 31/42* | (2006.01) |

(52) U.S. Cl.
CPC ............ *F16K 37/0041* (2013.01); *F15B 15/202* (2013.01); *F15B 15/2807* (2013.01); *F16K 27/04* (2013.01); *F16K 31/122* (2013.01); *F16K 31/42* (2013.01); *F16K 37/0025* (2013.01); *F16K 37/0033* (2013.01); *Y10T 137/8242* (2015.04)

(58) Field of Classification Search
CPC ............ F16K 37/0041; F16K 37/0033; F16K 31/1221; F16K 31/1226; F16K 31/122; F16K 27/04
USPC .............................. 137/554; 251/62, 63, 63.5
See application file for complete search history.

(56) References Cited

U.S. PATENT DOCUMENTS

| | | | |
|---|---|---|---|
| 3,993,284 A | 11/1976 | Lukens, Jr. | |
| 4,213,480 A * | 7/1980 | Orum et al. | .................... 137/556 |
| 5,685,336 A * | 11/1997 | Heiniger | ........................ 137/554 |
| 6,257,276 B1 | 7/2001 | Muller et al. | |

(Continued)

FOREIGN PATENT DOCUMENTS

| | | |
|---|---|---|
| DE | 4014474 | 1/1992 |
| DE | 69715022 | 5/1998 |
| DE | 10336065 | 3/2005 |
| EP | 0277309 | 8/1988 |
| EP | 0277309 | 10/1988 |
| EP | 0961066 | 12/1999 |

(Continued)

*Primary Examiner* — Atif Chaudry
(74) *Attorney, Agent, or Firm* — Hoffmann & Baron, LLP (57) ABSTRACT

A control head for a fluidically actuated valve having a main body which comprises a coupling device for fixing the main body to a shaft section of the valve and which supports a control valve device which is designed to provide a control fluid flow for actuating a fluid regulating agent in order to activate the valve, said regulating agent being arranged in the shaft section in a linearly movable manner, and having a path measurement device arranged on the main body, which is designed to determine an axial position of the regulating agent along a movement axis.

14 Claims, 6 Drawing Sheets

(56) References Cited

U.S. PATENT DOCUMENTS

2004/0099320 A1   5/2004  Oniduka et al.
2009/0139587 A1*  6/2009  Spliethoff et al. ............ 137/554

FOREIGN PATENT DOCUMENTS

WO    WO 2007/128360    11/2007
WO    WO2007128360      11/2007

* cited by examiner

CONTROL HEAD FOR A FLUID-ACTUATED VALVE

This application claims priority based on an International Application filed under the Patent Cooperation Treaty, PCT/EP2011/005420, filed Oct. 27, 2011, which claims priority to DE102010050662, filed Nov. 9, 2010.

BACKGROUND OF THE INVENTION

The invention relates to a control head for a fluid-actuated valve, comprising a base body having a coupling device for securing the base body to a shaft section of the valve and supporting a control valve device which is designed to provide a control fluid flow for actuating a fluidic control means capable of linear movement in the shaft section in order to actuate the valve, and further comprising a position sensing device located on the base body for the determination of an axial position of the control means along a movement axis.

WO 2007128360 discloses a housing assembly for monitoring, open- and closed-loop control systems for a process valve, in particular for a sterile valve for use in the pharmaceutical, biotechnology and cosmetics industries and for the food and drinks industries. The process valve in this specification comprises at least one valve plunger supporting a closing member and a pressure fluid-actuated drive for the valve plunger. On this process valve, the modular housing assembly can be releasably attached to the drive on the side remote from the process valve. Into the housing assembly there is inserted a drive rod connected to the valve plunger and comprising a position indicator which is contacted to the drive rod and which detects the current position of the valve plunger with respect to a fixed reference system. The housing assembly is designed to provide an indication of current positions and for this purpose comprises means for storing the current position indications, means for calculating and comparing position indications and means for visual and/or audible indication and/or for reading the functional state of the process valve.

DE 697 15 022 T2 discloses a valve assembly comprising a pressure-actuated valve and a control unit which is mounted at an end of an actuator which is opposite the valve. The control unit comprises a fluid passage for the provision of a pressure fluid, the fluid passage having a first end where a pressure fluid can be made available. The control unit is provided with coupling means which can be connected to coupling means provided on the actuator in order to ensure a non-rotatable connection between the control unit and the actuator. A second end of the fluid passage is in fluid connection with the actuator. A normally closed valve element is installed into the fluid passage and has a control element which can be coupled to the movable part of the valve and extends through the control unit. An outer end of the control element is connected to the actuator. The valve element is opened against the force of springs or against a differential pressure. As a result, the control unit can be installed and removed using a plug-in connection, and at the same time the valve element can be opened automatically or closed for fast and simple servicing.

DE 401 44 74 C1 discloses a disc valve with a control head mounted on its housing by way of a spacer provided with view openings, its shaft being connected to the rod of the valve disc, wherein the spacer, which can be flange-mounted on the base of the control head, is integrated with a valve housing cover which can be secured to the valve housing, and wherein the valve disc rod extending through the control head is guided in the hollow shaft of the control piston. The shaft of the control piston, which is supported on an annular shoulder of the valve disc rod on the valve side, is put under pressure by a nut which can be screwed onto the section of the valve disc rod which projects beyond the control head.

DE 103 36 065 A1 discloses a pneumatic valve drive with a housing comprising a cylinder and an end wall at each axial end of the cylinder, and with a piston which is connected to an axial spindle and axially guided in the cylinder while being sealed against the cylinder at its circumference, and with a first uniform interface for a control head formed at one of the end walls and a second uniform interface for a valve fitting to be actuated by the spindle formed at the other end wall.

From EP 961 066 A2 is known a freely programmable position indication device with a movable actuator, in particular for valves, wherein a position sensing device which continuously detects the position of the actuator while generating an analogue output signal is assigned to the actuator and wherein the output signal of the position sensing device is applied to an electronic evaluation device for the determination of the position indication.

SUMMARY OF THE INVENTION

The invention is based on the problem of providing a control head which simplifies the maintenance of the fluid-actuated valve.

This problem is solved by the features of claim 1. According to this, it is provided that a recess extending along the movement axis and accommodating a locking sleeve which is part of the coupling device and mounted rotatably passes through the base body, a section of the locking sleeve for example bounding a movement chamber for the control means while forming a seal. The locking sleeve therefore advantageously has a double function, on the one hand providing a mechanical coupling between the control head and the valve while on the other hand bounding and sealing the movement chamber for the control means. Owing to the sleeve-like design of the locking sleeve, a separation is obtained between the coupling region itself, where the mechanical connection between the control head and the valve is established, and an actuating region, where the actuating forces required for establishing or releasing the connection between the control head are introduced. This is particularly advantageous if the control head is to have as smooth and even a surface as possible in the immediate vicinity of the valve in order to avoid an accumulation of contaminants and to facilitate the cleaning of the surfaces. Such requirements apply, for example, to control heads provided for use in the food industry. According to the invention, the key surfaces usually provided for operating the coupling device, for example a slot for a screwdriver or an internal or external hexagon for a suitable hexagon head spanner, are located at a distance from the coupling region. Furthermore, the sleeve-like design of the locking sleeve determines the movement chamber for the control means. By way of example, the control means may be an operating piston of the valve which is coupled to a valve member, its movement causing a corresponding movement of the valve member. For the activation of the valve member, the movement chamber which houses the control means is subjected to a presettable fluid pressure, thereby causing a linear movement of the control means along the movement axis. In this context, it is advantageous if at least some regions of the movement chamber are bounded and sealed by the locking sleeve, in particular in a direction away from the valve, making additional sealing measures unnecessary.

Advantageous further developments are the subject matter of the dependent claims.

It is expedient if the locking sleeve is closed and sealed in an end region remote from the control means. In this case, the sealing function for the movement chamber of the control means is provided directly by the locking sleeve, and there is no need for additional measures which would, for example, complicate the design of the base body or require additional components. On the contrary, the locking sleeve has an end wall which may be formed integrally or else joined non-positively and/or by adhesive force and/or positively to an adjoining sleeve section and which seals the end of the movement chamber.

In a further development of the invention, it is provided that the locking sleeve has in an end region facing the control means a locking geometry, in particular a threaded section, for the positive location of the base body on the shaft section of the valve. With this positive coupling of the base body to the shaft section, a connection capable of withstanding high mechanical loads can be obtained on the one hand, and the control head can easily be released from the valve on the other hand. The locking geometry is preferably represented by an arrangement of corresponding threaded sections on the locking sleeve and on the shaft section of the valve.

An operating passage designed for a communicating fluid connection between the movement chamber for the control means and the control valve device mounted on the base body preferably passes through a wall region of the recess of the base body and a wall section of the locking sleeve in order to enable the valve to be actuated fluidically. This ensures a simple fluid coupling of the control valve device which provides the fluid flow for the activation of the control means and the valve member coupled thereto to the movement chamber in which the control means is housed for linear movement. The operating passage for example extends from an operating outlet of the control valve device mounted on the base body through the base body and through the locking sleeve into the movement chamber, thus allowing the supply and/or discharge of a pressurised fluid such as compressed air into and/or out of the movement chamber. In a further development of the invention, several operating passages which are fluidically separated from one another may be provided as an alternative.

In a variant of the invention, it is provided that sections of the operating passage are designed as a continuous annular passage between the wall region of the recess of the base body and the locking sleeve. This ensures a reliable communicating connection between the operating outlet of the control valve device and the movement chamber irrespective of the rotary position of the locking sleeve. The annular passage is preferably oriented rotationally symmetrically with respect to an axis of rotation of the locking sleeve, so that the same cross-section of the annular passage is always available for the operating passage while the locking sleeve rotates about the axis of rotation. The annular passage may be designed as a continuous annular groove in the locking sleeve and/or as a continuous annular groove in the wall region of the recess of the base body. In a cross-sectional plane including the axis of rotation and/or the movement axis, the annular groove preferably has an at least substantially rectangular cross-section.

In an advantageous further development of the invention, it is provided that at least one continuous sealing means placed between the wall region of the recess of the base body and the locking sleeve is provided at an axial distance from the annular passage. This at least one sealing means has the purpose of sealing the locking sleeve, which is rotatably accommodated in the recess of the base body and which is designed for sealing the movement chamber for the control means, against the environment and of ensuring the rotatability of the locking sleeve. Continuous sealing means are preferably provided in opposite spatial directions at an axial distance from the annular passage to ensure a good seal for the annular passage against the environment. The sealing means may for example be O-rings with a circular or rectangular cross-section housed in continuous sealing grooves formed in the base body and/or in the locking sleeve by way of example.

It is expedient if the locking sleeve is located on the base body in such a way that an axis of rotation of the locking sleeve is oriented parallel to the movement axis of the control means.

It is preferably provided that the position sensing device is designed for a non-contact scanning of the axial position of the control means through the locking sleeve. There is therefore no need for additional coupling means for an active connection between the position sensing device and the control means. On the contrary, all that is needed is the location of the control head on the valve shaft by means of the coupling device. The non-contact coupling to the position sensing device, which is necessary for determining the axial position of the control means, is established automatically, for example by magnetic means provided on the control means and by a design of the position sensing device as a magnetic field sensor, in particular a Reed switch or a Hall sensor. The non-contact scanning of the control means further considerably simplifies the sealing of the movement chamber against the environment, because there is no need for mechanical coupling means between the control means and the position sensing device.

It is advantageous if the base body includes mounting sections for the location of the position sensing device and/or the control valve device, at least parts of which mounting sections surround the locking sleeve. With the aid of the mounting sections, which may for example be designed as groove-like recesses and/or mounting surfaces, in particular plane surfaces, and/or blind holes with or without a thread, the position sensing device and/or the control valve device is/are quickly and reliably located on the base body. The mounting sections are preferably designed such that the position sensing device can be displaced in or on the mounting section along the movement axis of the control means, for example for adjusting the position sensing device with respect to the control means. In a particularly preferred development, a positive coupling between the position sensing device and/or the control valve device and the base body is provided by the associated mounting section, for example to ensure an advantageous orientation of the position sensing device relative to the base body and to the control means guided therein.

It is expedient if the base body is formed with an annulus-type or annulus sector-type cross-section in a cross-sectional plane oriented perpendicular to the movement axis. Preferably, the base body rims the recess provided for the accommodation of the control means, which recess may in particular have a circular cross-section. A compact arrangement of the position sensing device and/or the control valve device, which can be provided thereby, is particularly preferred.

In a further development of the invention, it is provided that at least one mounting section is designed on the base body as a groove-like recess oriented along the movement axis for the accommodation of the position sensing device. In a cross-sectional plane oriented at right angles to the movement axis, the groove-like recess preferably has a U- or T-shaped cross-section, which allows a positive location in at least three directions in space for the position sensing device, which is designed as a rectangular component by way of example. The corresponding design of the groove-like recess and the position sensing device facilitates the alignment of the position sensing device parallel to the movement axis. This ensures a fast adjustment of the position sensing device and a mounting of the position sensing device on the base body which can withstand high mechanical loads.

In an end region of the base body which is remote from the control means, coupling means are preferably provided for a cover, which coupling means are designed for the tool-less and/or sealing location of the cover and/or as abutments for the end region of the locking sleeve. The cover protects the position sensing device and/or the control valve device mounted on the base body against external influences such as moisture and/or dirt. The coupling means are designed such that they allow a tool-less and/or sealing location of the cover. For servicing, for example, this can simply be removed from the base body and then replaced thereon to fulfil its protective function. As an alternative or in addition, the coupling means can act as abutments for the end region of the locking sleeve, which is rotatably installed in the base body. As the length of the locking sleeve matches the stroke of the control means and may be a multiple of the diameter of the locking sleeve, a support of the locking sleeve on an abutment formed in the region of the coupling means is advantageous for the rotatable mounting of the locking sleeve.

It is advantageous if an annular groove in which a sealing ring for a sealing contact of a cover can be accommodated is formed on a circumferential surface of the base body. This allows a tight connection to be achieved with simple means between the base body on the one hand and the cover on the other hand. The sealing ring may be a round-section ring or a profiled O-ring which is housed in the continuous annular groove on the base body and which seals the annular gap required for mounting the cover against an inner surface of the cover.

In an advantageous further development of the invention, it is provided that the base body together with the cover forms a sealed volume for the control valve device and/or the position sensing device. This keeps contamination and other external influences away from the control valve device and the position sensing device.

BRIEF DESCRIPTION OF THE DRAWINGS

An advantageous embodiment of the invention is shown in the drawing, of which.

DETAILED DESCRIPTION OF THE PREFERRED EMBODIMENTS

Figure 1:
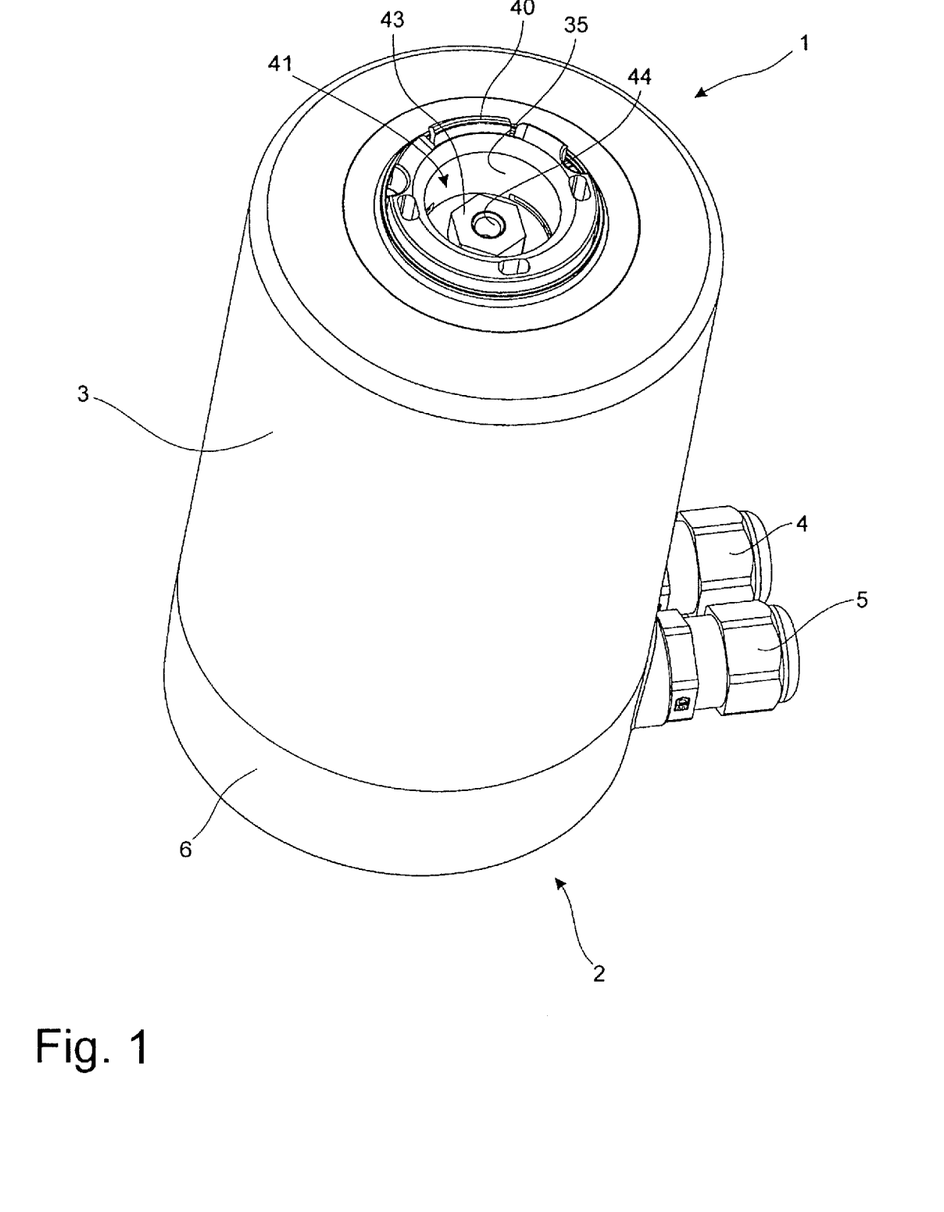
FIG. 1 is a perspective representation of a control head for a fluid-actuated valve.

A control head 1 shown in FIG. 1 is designed for mounting on a fluid-actuated valve not shown in the drawing. The valve may in particular be a process valve designed for influencing the flow of a process medium, for example a gas or a liquid. The control head 1 has the purpose of moving the fluid-actuated valve into the desired valve position by providing a pressurised fluid. For this purpose, the control head 1 comprises various components to be described in greater detail at a later point, which allow a fluid to be made available and, if required, a monitoring of the valve position of the fluid-actuated valve.

The control head 1 comprises a base body 2, which is designed in several parts in the illustrated embodiment and which supports several different components for influencing and/or controlling a flow of control fluid to the fluid-actuated valve. For this purpose, the base body together with a bowl-type cover 3 encloses a component chamber 9 described in greater detail below and shown in FIG. 2, in which the components required for activating and/or controlling the fluid-actuated valve are housed and protected from the environment.

In the embodiment shown in FIG. 1, the base body 2 is fitted with two cable glands 4, 5 provided for routing electric cables not shown in the drawing into the component chamber 9. Using the cables not shown in the drawing, for example, electric supply voltages and/or control signals can be made available to the control head 1 by a supply and/or control unit not shown in the drawing.

Figure 2:
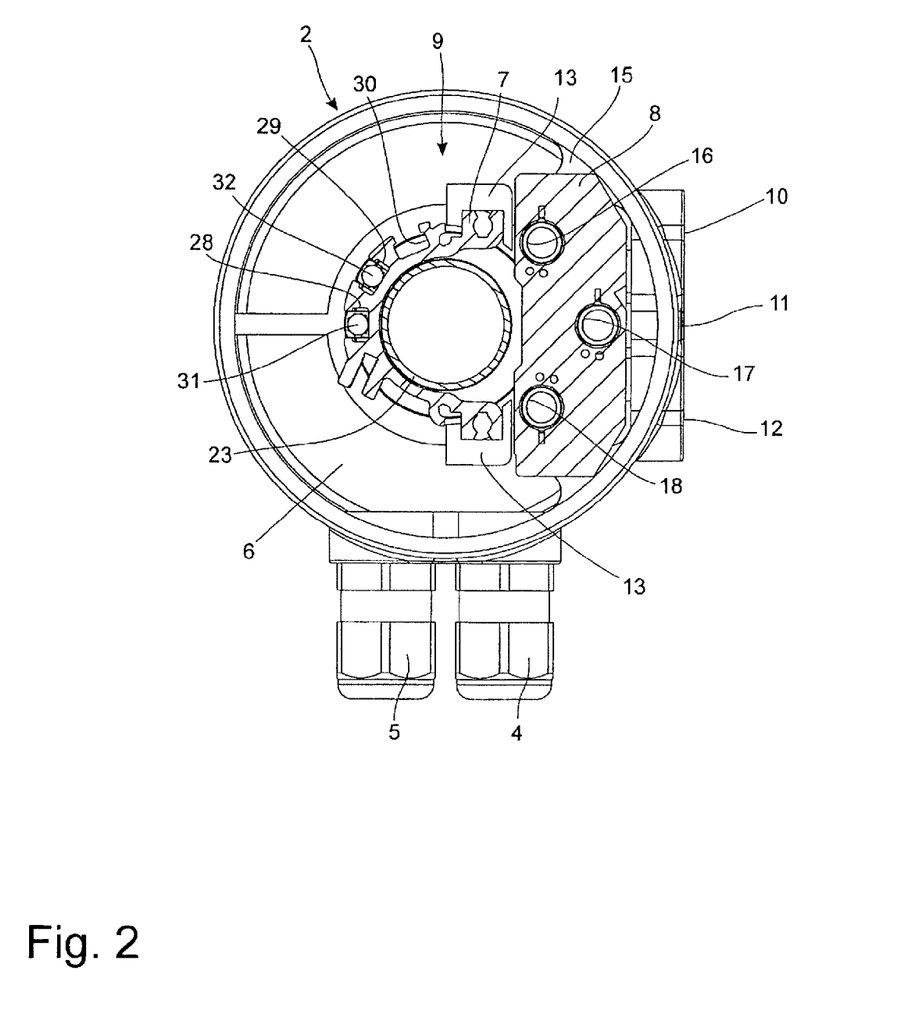
FIG. 2 is a sectional top view of the control head according to FIG. 1.

In FIG. 2, which is a partially sectional top view of the control head 1 without the cover 3, it can be seen that, in addition to the cable glands 4, 5 for the power supply of the control head 1, several fluidic connections 10 to 12 are provided on the base body 2. These are designed for the provision of one or more pressurised fluids, in particular compressed air, for the control head 1. In the illustrated embodiment, the connections 10 to 12 are integrally formed with a cup-shaped coupling body 6, which, together with a substantially U-shaped sensor support 7, forms the base body 2. The coupling body 6 is preferably a die-cast aluminium component or a plastic injection moulding. In a particularly preferred variant, the sensor support 7 has, as can be seen in FIG. 2, a cross-section which is substantially equal along its entire longitudinal dimension. The sensor support 7 is in particular designed as an extruded aluminium component. The sensor support 7 is preferably aligned relative to the coupling body 6 by means of two U-shaped guide rails 13 arranged opposite one another and formed integrally with the coupling body 6.

In the region of the fluidic connections 10 to 12, the coupling body 6 has a coupling surface 15 oriented parallel to the view plane of FIG. 2 and preferably flat. A fluid block 8 shown in section in FIG. 2 by way of example is mounted on the coupling surface 15 while forming a seal. The fluid passages not shown in detail, which extend from the fluidic connections 10 to 12 inwards in a substantially radial direction or at right angles to the view plane of FIG. 2 and which are not visible in FIG. 2, terminate at the coupling surface 15. The fluid passages are provided for a communicating connection between the fluid bores 16 to 18 formed in the fluid block 8 and the associated fluidic connections 10 to 12.

Figure 3:
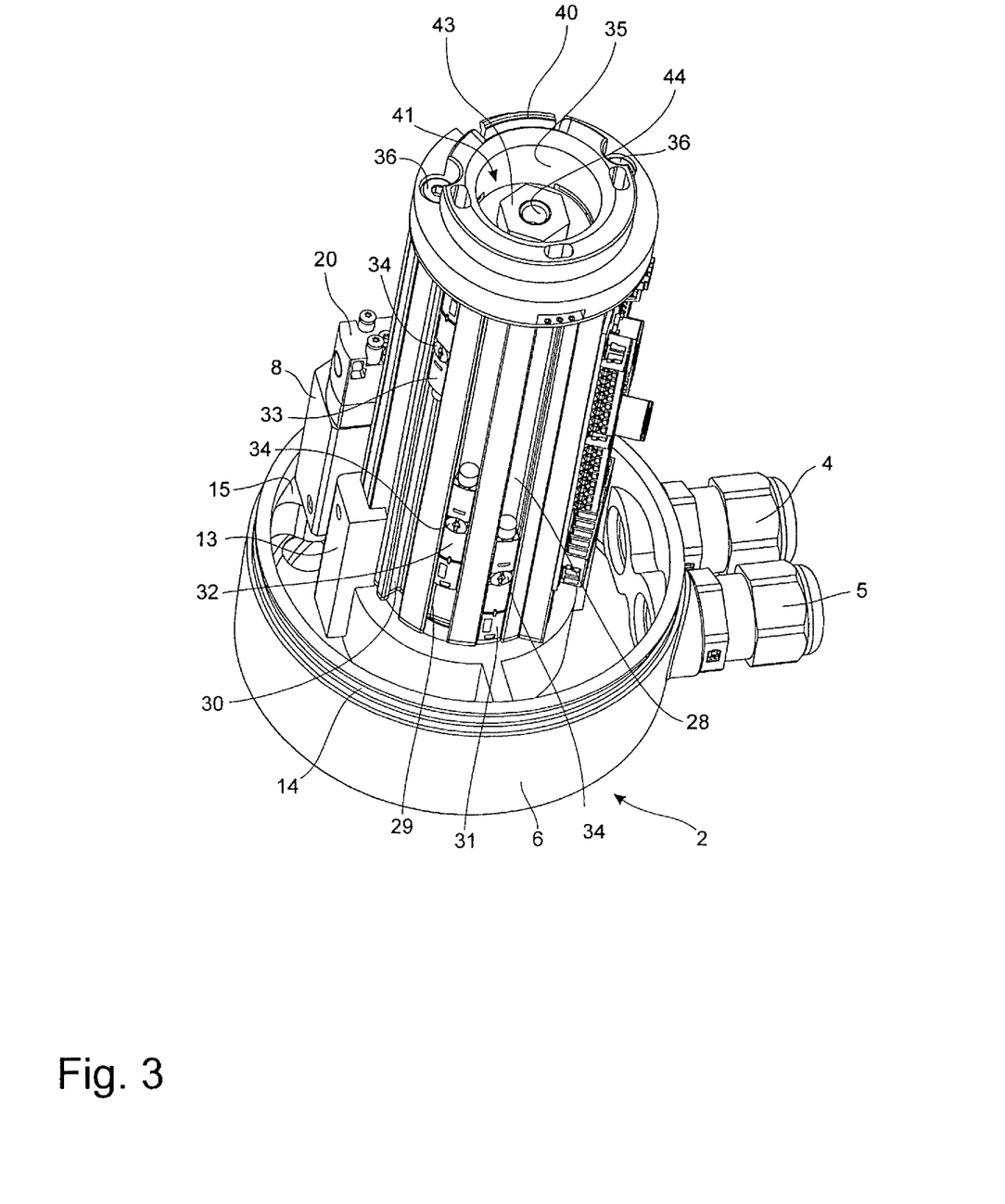
FIG. 3 is a perspective view of the control head with the cover removed.
Figure 4:
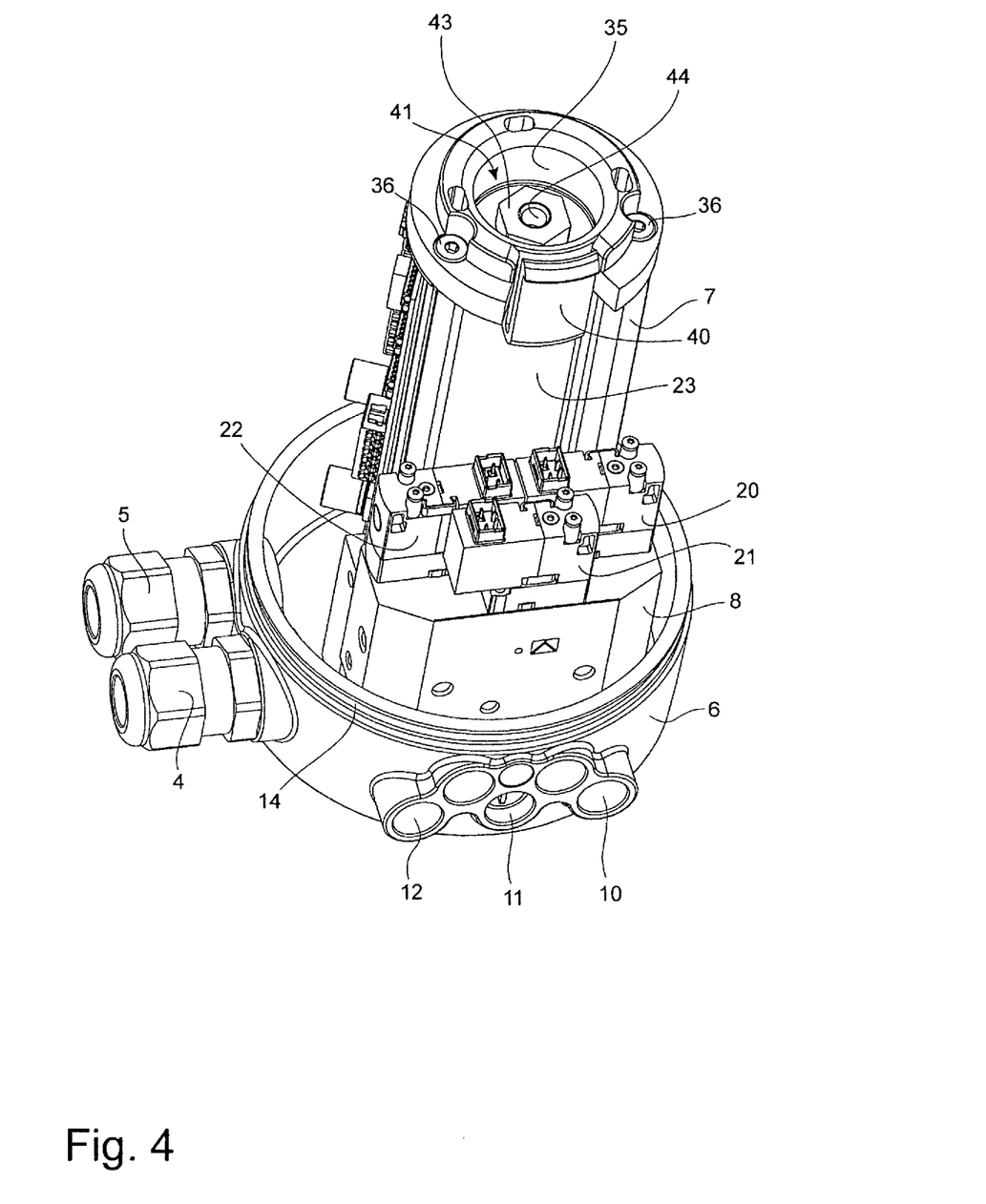
FIG. 4 is a second perspective view of the control head with the cover removed.

As FIGS. 3 and 4 show, three valve devices 20 to 22, which may for example be solenoid valves or piezoelectric valves and which are designed for influencing the pressurised fluid which can be made available at the fluidic connections 10 to 12, are mounted on a, for example parallel, surface 19 of the fluid block 8 in order to transfer the pressurised fluid(s) in a presettable manner to the valve not shown in the drawing.

Some sections of the sensor support 7 encompass in the manner of a plain bearing a locking sleeve which is in the illustrated embodiment annular, extends along a movement axis 24 and is designed as a guide sleeve 23. The guide sleeve 23, which is housed in the base body 2 and rotatable about the movement axis 24, serves as a locking sleeve for the location of the base body 2 on the fluid-actuated valve not shown in detail and for the accommodation of a control means of the fluid-actuated valve, which is capable of linear movement and shown in greater detail in FIG. 6.

On the sensor support 7, several in particular T-shaped grooves 28 to 30 are formed in which limit switches 31 to 33 shown in greater detail in FIG. 3 can be accommodated, for example. The limit switches 31 to 33 may for example be Hall sensors or Reed switches which, together with the control means shown in greater detail in FIG. 6, allow the position of the fluid-actuated valve to be determined for a functional position. The limit switches 31 to 33 are preferably designed as cubic bodies having dimensions which substantially match those of the mounting grooves 28 to 30, so that the limit switches 31 to 33 can be displaced along the mounting grooves 28 to 30 parallel to the movement axis 24 virtually without play. Owing to the T-profile of the mounting grooves 28 to 30 which is provided in the illustrated embodiment, the limit switches 31 to 33 can be located non-positively or positively in the mounting grooves 28 to 30 by means of suitable rotary latches 34.

In the end region of the sensor support 7 which is remote from the coupling body 6, a substantially rotationally symmetric coupling ring 35 is mounted. The coupling ring 35 is joined to the sensor support 7 by means of fasteners 36 designed as screws in the illustrated embodiment and has an at least almost continuous annular collar 37 which serves as a mounting surface for the cover 3. In addition, the coupling ring 35 of the illustrated embodiment is provided with a resiliently mounted latching lug 40, which can be seen in greater detail in FIGS. 5 and 6 and which is designed for the positive location of the cover 3. A cylindrical recess 41 in the coupling ring 35 further serves as an abutment in the form of a plain bearing for the guide sleeve 23, which is mounted for rotation about the movement axis 24.

Figure 5:
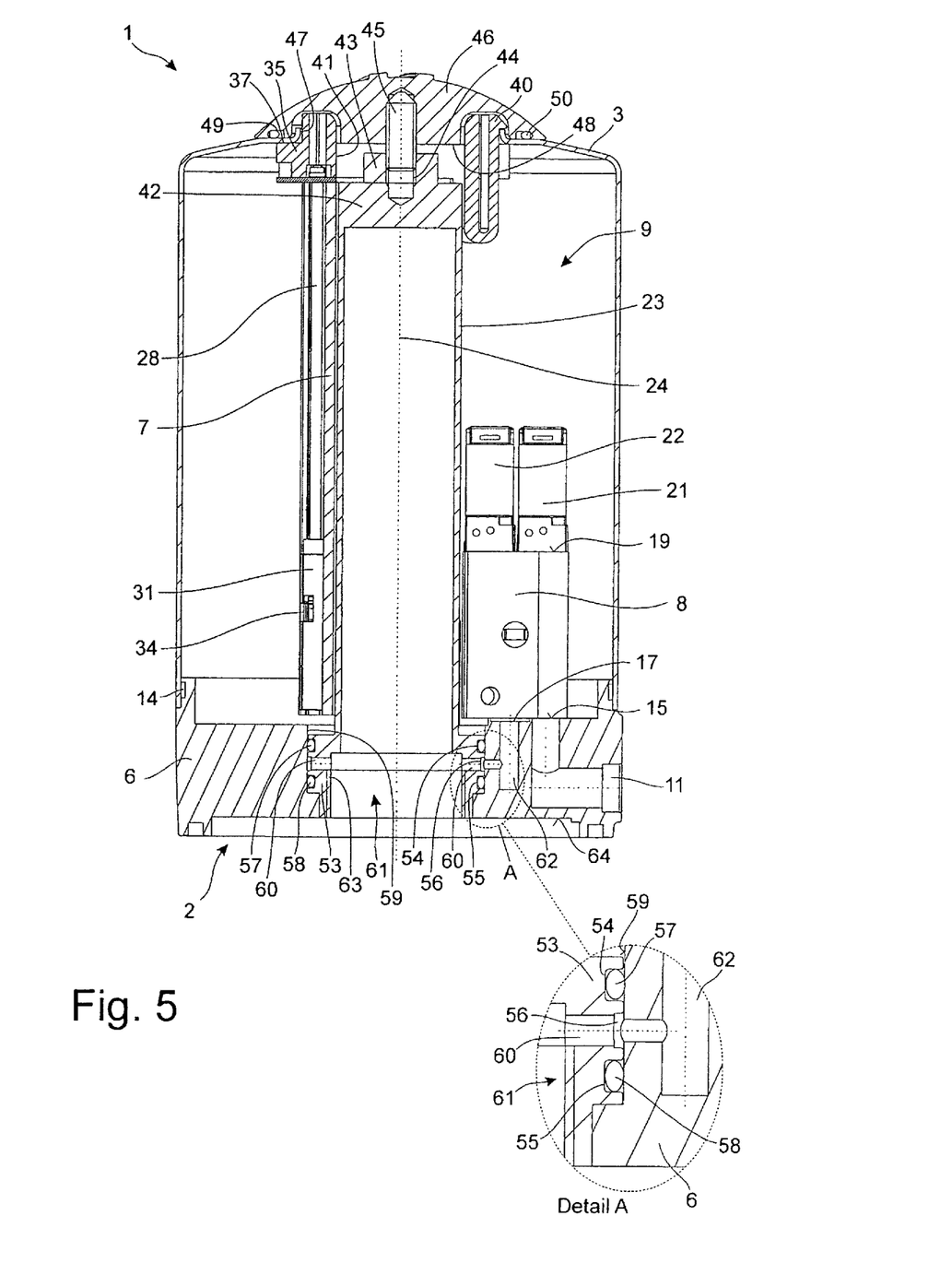
FIG. 5 is a sectional side view of the control head.

As the sectional view of FIG. 5 shows, the guide sleeve 23 is at the end in the region of the coupling ring 35 provided with an end cover 42 which seals the end of the guide sleeve 23 and may be formed integrally therewith as in the illustrated embodiment. In this, the end cover 42 has an external hexagon 43 providing application surfaces for a spanner for applying a torque to the guide sleeve 23. By applying a suitable torque to the guide sleeve 23, a rotary movement of the guide sleeve about the movement axis 24 can be initiated, by means of which the control head 1 can be locked and unlocked on the fluid-actuated valve as described in greater detail below.

The end cover 42 moreover has a threaded hole 44 for a setscrew 45 shown in greater detail in FIG. 5, which in the illustrated embodiment is in turn accommodated in a screw cover 46 which is produced in an injection moulding process for example. The screw cover 46 is used for the axial location of the cover 3 and for sealing the circular recess 47 which is provided at the end of the cover 3 and which is matched to the continuous annular collar 37 of the coupling ring 35. For a sealing action between the screw cover 46 and the cover 3, the illustrated embodiment provides for a continuous groove 49 on the end face 49 of the screw cover 46 which faces the cover 3, in which groove 49 a continuous sealing means such as an O-ring 50 can be accommodated.

In an end region of the guide sleeve 23 which is remote from the end cover 42, a continuous annular collar 53 extending in a radially outward direction is provided. This annular collar 53 has a total of three continuous grooves 54 to 46 spaced in the axial direction along the movement axis, of which the grooves 54 and 55 are designed to accommodate sealing means 57, 58, in particular O-rings. The annular collar 53 and the sealing means 57, 58 are matched to a preferably circular recess 59 in the coupling body 6 in such a way that they seal the continuous groove 56 in the axial direction along the movement axis 24 both towards the top and towards the bottom. In this way, the continuous groove 56 can serve as a sealed annular passage. From the continuous groove 56, bores 60 which ensure a communicating connection between an interior 61 enclosed by the guide sleeve 23 and an operating passage 62 formed in the coupling body 6 extend in a radially inward direction through the guide sleeve 23. The operating passage 62 is in a manner not shown in detail in communicating connection with at least one of the valve devices 20 to 22 via the fluid block 8 and can therefore communicate with and be connected to one of the fluidic connections 10 to 12 depending on the switching position of the associated valve device 20 to 22 for a supply or discharge of pressurised fluid into the interior 61 or from the interior 61. In addition, the combination of annular collar 53 and circular recess 59 in the coupling body 6, together with the sealing means 57, 58 provided in between, serves as a pivot bearing for the guide sleeve 23, which has at its open end adjacent to the annular collar 53 a female thread 63 for forming a screw joint with the fluid-actuated valve shown in FIG. 6.

Figure 6:
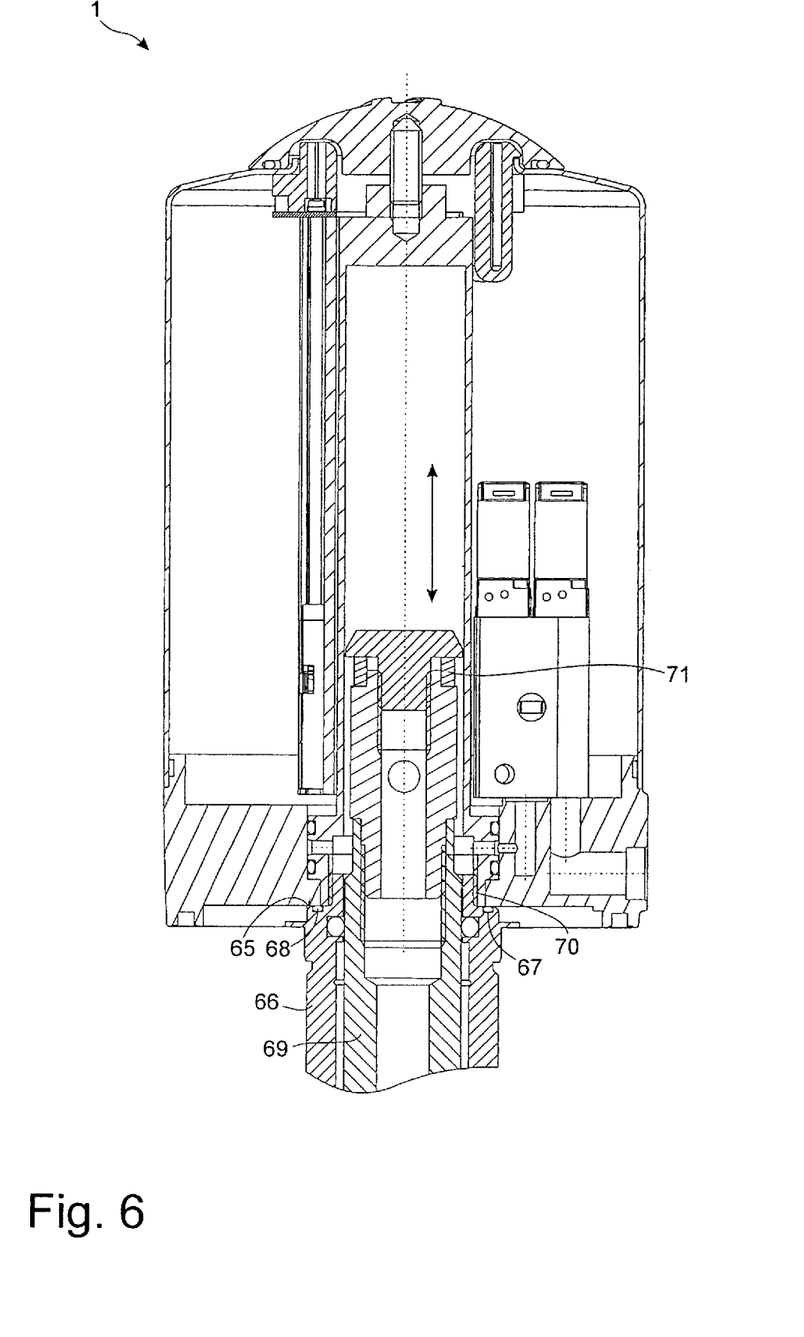
FIG. 6 is a sectional side view of the control head mounted on a fluid-actuated valve.

To locate the control head 1 on the fluid-actuated valve shown in greater detail in FIG. 6, a substantially flat mounting surface 64 designed for lying on an annular collar 65 of a shaft section 66 is formed on an underside of the coupling body 6. In the illustrated embodiment, the annular collar 65 is provided with a continuous groove 67 which faces the mounting surface 64 and which accommodates a sealing means 68 for a fluid-tight seal between the coupling body 6 and the shaft section 66. In the shaft section 66 of the valve, a multi-part, substantially sleeve-shaped control means 69 is provided, which is capable of linear movement along the movement axis 24 and which acts on a valve member located along the movement axis 24 in a region remote from the control head 1 and not shown in the drawing, in order to transfer the valve member for example from an open to a closed position and vice versa. The control means 69 is preferably designed as a part of an actuating piston which can be moved along the movement axis 24, for example in a vertically downward direction as shown in FIG. 6, by applying pressure to the interior 61 substantially bounded by the guide sleeve 23. As a result of this linear movement of the control means 69, the valve member of the fluid-actuated valve not shown in the drawing can block or unblock a cross-section of a fluid line.

For mounting the control head 1 on the shaft section 66 of the fluid-actuated valve not shown in detail, the screw cover 46 is first lifted off by releasing the setscrew 45 in the threaded hole 44 in a rotary movement about the movement axis 24. This also releases the sealed connection between the screw cover 46 and the surface of the cover 3. By removing the screw cover 46, the external hexagon 43 at the end of the guide sleeve 23 is made accessible. In a next step, the control head 1 can be placed on the annular collar 65 of the shaft section 66 with the contact surface 64 of the coupling body 6. For this mounting operation, a torque is applied to the external hexagon 43 by means of an operating device not shown in the drawing, such as a spanner. This torque causes a rotation of the guide sleeve 23 about the movement axis 24. In this process, the guide sleeve 23 is supported in the recess 41 of the coupling ring 35 and in the circular recess 59 of the coupling body 6. The rotary movement results in an engagement between the female thread 63 provided at an open end of the guide sleeve 23 and a male thread 70 formed on the shaft section 66. In this way, a positive connection can be established between the guide sleeve 23 and the shaft section 66. After the control head 1 has been located on the valve, a sealed connection is moreover established between the contact surface 64 of the coupling body 6 and the annular collar 65 of the shaft section 66.

By the arrangement of the grooves 54 to 56 of the guide sleeve 23, an annular passage 56 is bounded which is independent of the rotary position of the guide sleeve 23 relative to the movement axis 24 and which ensures a communication connection between the interior 61 and the operating passage 62 at all times. Irrespective of its rotary position, the guide sleeve 23 therefore provides a supply and/or discharge of pressurised fluid into or from the interior 61, whereby the desired, in particular linear, movement of the control means 69 can be initiated.

In an end region facing the control head 1, the control means 69 can for example be provided with an annular magnet device 71 which acts as a signal generator for the limit switches 31 to 33 in the sensor support 7. These limit switches 31 to 33 are for example designed as Hall sensors and can be displaced in the mounting grooves 28 to 30 along the movement axis 24 and located in the desired position by means of associated rotary latches 34. The limit switches 31 to 33 comprise a cable connection not shown in the drawing to a likewise not shown evaluation device, wherein the cables can be routed through one of the cable glands 4, 5. The valve devices 20 to 22 fitted to the fluid block 8 are likewise connected to a control unit via an electric cable connection not shown in the drawing.

For adjusting the position of the limit switches 31 to 33 along the movement axis 24 and/or for servicing the valve devices 20 to 22, the cover 3 can be released and lifted off the coupling ring 35 by pushing back the resiliently mounted latching lug 40. In this process, a sealed connection between the open end region of the cover 3 and the coupling body 6, which is designed in the manner of a continuous annular collar with an integrated continuous sealing groove 14, is released as well. After the removal of the cover 3, the valve devices 20 to 22 and the limit switches 31 to 33 are freely accessible and can be replaced, adjusted or serviced.

As the limit switches 31 to 33 are connected to the coupling body 6 via the sensor support 7 and the valve devices 20 to 22 are likewise connected to the coupling body 6 via the fluid block, the control head 1 forms a fully functional assembly which, owing to the fastening action of the guide sleeve 23 on the shaft section 66, can be removed and replaced easily. Having a twin function, the guide sleeve 23 is, when acting as a fastening means, on the one hand provided with the female thread 63 for locating the base body 2, in particular the coupling body 6, on the shaft section 66. On the other hand, the guide sleeve is used to bound the fluidically active interior 61 serving as a piston chamber for the control means 69. The control head 1 therefore fulfils two essential functions by on the one hand enabling pressure to be applied to the control means 69 for influencing the position of the valve member (not shown) of the fluid-actuated valve and by on the other hand making it easy to determine the position of the control means 69.

As a result of the elongated design of the guide sleeve 23 and of the access opening not shown in detail, which is remote from the fluid-actuated valve and designed as a circular recess 47 in the cover 3, any contamination of the components provided in the component chamber 9 of the control head 1, in particular of the limit switches 31 to 33 and the valve devices 20 to 22, is virtually eliminated. It is further advantageous that the control head 1 can be accurately positioned along the movement axis 24 as a result of the geometrical relationship between the contact surface 64 formed on the coupling body 6 and the annular collar 65 formed on the shaft section 66, so that a repeatable position of the limit switches 31 to 33 relative to the control means 69 is ensured even after removal and reassembly.

Moreover, apart from the screwed connection between the guide sleeve 23 and the shaft section 66, no other connections between the control head 1 and the fluid-actuated valve have to be released or tightened; on the contrary, the control head 1 constitutes an independently functional assembly which can be tested, serviced and adjusted even if removed from the fluid-actuated valve not shown in the drawing.

The invention claimed is:

1. A control head for a fluid-actuated valve, comprising a base body having a coupling device for securing the base body to a shaft section of the valve and supporting a control valve device, which is designed to provide a control fluid flow for actuating a fluidic control means capable of linear movement in the shaft section in order to actuate the valve, and further comprising a position sensing device located on the base body for the determination of an axial position of the control means along a movement axis, wherein the base body further comprises a coupling body including a recess extending along the movement axis and the coupling device includes a locking sleeve having an annular collar mounted rotatably within the recess of the coupling body, a section of the locking sleeve bounding a movement chamber for the control means while forming a seal and the annular collar having an inner engagement surface for securing the shaft section of the valve to the base body.

2. A control head according to claim 1, wherein the locking sleeve is closed and sealed in an end region remote from the control means.

3. A control head according to claim 1, wherein the inner engagement surface of the annular collar of the locking sleeve has, in an end region facing the control means, a threaded section for the positive location of the base body on the shaft section of the valve.

4. A control head according to claim 1, wherein the position sensing device is designed for a non-contact scanning of the axial position of the control means through the locking sleeve.

5. A control head according to claim 1, wherein the base body includes at least two mounting sections for the location of the position sensing device and/or the control valve device, at least parts of which mounting sections surround the locking sleeve.

6. A control head according to claim 5, wherein at least one mounting section is designed on the base body as a groove-like recess oriented along the movement axis for the accommodation of the position sensing device.

7. A control head according to claim 1, wherein a region of the base body is formed with an annulus-type or annulus sector-type cross-section in a cross-sectional plane oriented perpendicular to the movement axis.

8. A control head according to claim 1, wherein, in an end region of the base body which is remote from the control means, coupling means are provided for a cover, which coupling means are designed for the tool-less and/or sealing location of the cover and/or as abutments for the end region of the locking sleeve.

9. A control head according to claim 8, wherein an annular groove in which a sealing ring for a sealing contact of a cover can be accommodated is formed on a circumferential surface of the base body.

10. A control head according to claim 8, wherein the base body together with the cover forms a sealed volume for the control valve device and/or the position sensing device.

11. A control head for a fluid-actuated valve, comprising a base body having a coupling device for securing the base body to a shaft section of the valve and supporting a control valve device, which is designed to provide a control fluid flow for actuating a fluidic control means capable of linear movement in the shaft section in order to actuate the valve, and further comprising a position sensing device located on the base body for the determination of an axial position of the control means along a movement axis, wherein a recess extending along the movement axis and accommodating a locking sleeve, which is part of the coupling device and mounted rotatably, passes through the base body, a section of the locking sleeve bounding a movement chamber for the control means while forming a seal, and wherein an operating passage designed for a communicating fluid connection between the movement chamber for the control means and the control valve device mounted on the base body passes through a wall region of the recess of the base body and a wall section of the locking sleeve in order to enable the valve to be actuated fluidically.

12. A control head according to claim 11, wherein sections of the operating passage are designed as a continuous annular passage between the wall region of the recess and the locking sleeve.

13. A control head according to claim 12, wherein at least one continuous sealing means placed between the wall region of the recess of the base body and the locking sleeve is provided at an axial distance from the annular passage.

14. A control head for a fluid-actuated valve, comprising a base body having a coupling device for securing the base body to a shaft section of the valve and supporting a control valve device, which is designed to provide a control fluid flow for actuating a fluidic control means capable of linear movement in the shaft section in order to actuate the valve, and further comprising a position sensing device located on the base body for the determination of an axial position of the control means along a movement axis, wherein a recess extending along the movement axis and accommodating a locking sleeve, which is part of the coupling device and mounted rotatably, passes through the base body, a section of the locking sleeve bounding a movement chamber for the control means while forming a seal, and wherein the locking sleeve is located on the base body in such a way that an axis of rotation of the locking sleeve is oriented parallel to the movement axis of the control means.

* * * * *